Oct. 19, 1965  R. W. CROWE ETAL  3,213,312
ULTRAVIOLET DETECTOR TUBE WITH A GAS FILLING
OF HYDROGEN, HELIUM AND A NOBLE GAS
Filed May 22, 1963

INVENTORS
ROBERT W. CROWE
JOHN B. JOHNSON
BY
George H. Fritzinger
AGENT 3,213,312
ULTRAVIOLET DETECTOR TUBE WITH A GAS FILLING OF HYDROGEN, HELIUM AND A NOBLE GAS
Robert W. Crowe, West Orange, and John B. Johnson, Millburn, N.J., assignors to McGraw-Edison Company, Elgin, Ill., a corporation of Delaware
Filed May 22, 1963, Ser. No. 282,373
2 Claims. (Cl. 313—101)

This invention relates to radiation detector tubes and more particularly to improved ultraviolet detector tubes having a novel ionizable gaseous filling.

The invention relates especially to ultraviolet detector tubes of the character described and claimed in the Howling Patent No. 3,047,761, dated July 31, 1962. However, no unnecesary limitation of the invention to such tube is intended.

An object of the invention is to provide an improved ultraviolet detector tube which has an unexpectedly low striking voltage, an extremely low sensitivity to solar radiation and a high sensitivity to ultraviolet radiation.

Another object of the invention is to provide such an ultraviolet detector tube which has improved operational stability and greater life.

Another object is to provide such an improved ultraviolet detector tube which has a novel ionizable gaseous filling consistig of a combination of helium, hydrogen and one of the noble gases consisting of neon, argon, krypton and zenon.

A still further object of the invention is to provide an improved ultraviolet detector system having a simplified operating circuit.

These and other objects of the invention will be apparent from the following description and the appended claims.

In the description of the invention reference is had to the accompanying drawings, of which:

Figure 1:
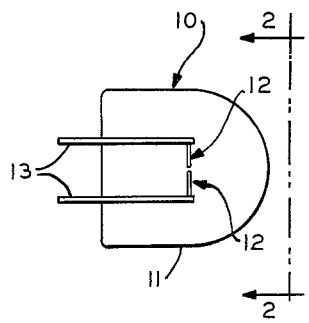
FIGURE 1 is a side elevational view of a radiation detector tube according to the invention.
Figure 2:
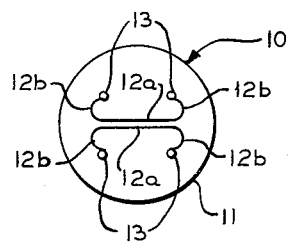
FIGURE 2 is an end view of this radiation detector tube as seen from the line 2—2 of FIGURE 1.
Figure 3:
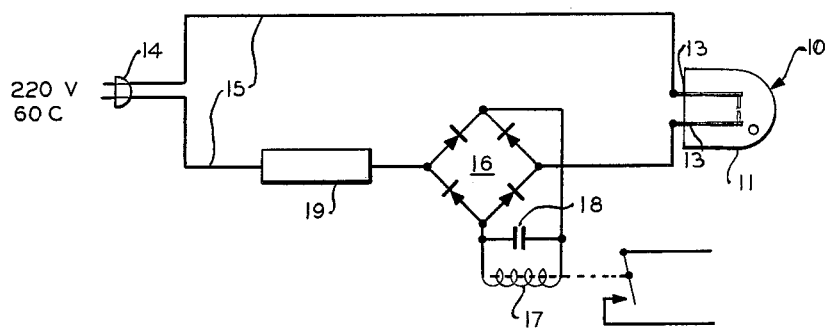
FIGURE 3 is a view showing a simplified operating circuit for the present detector tube.

The detector tube 10 shown in FIGURES 1 and 2 to illustrate the invention comprises a closed envelope 11 of a bulbous or semi-spherical shape made of a suitable glass permeable to ultraviolet light. In this envelope there are supported two wire electrodes 12 preferably of tungsten having intermediate portions 12a in a plane crosswise to the axis of the tube and in an adjacent relationship forming a working region wherein the emission of an electron is effective to trigger an avalanche discharge when a striking potential is applied across the electrodes. The end portions 12b of the wire electrodes are curved away from each other and secured as by welding to support rods 13 leading through the base of the envelope.

The tube is operated from a source of pulsating voltage wherein each pulse reaches at least a striking potential and falls below a sustaining potential to quench the tube. When the tube has symmetrical electrodes each electrode may operate equally well as cathode or anode. A pulsating voltage for the present purposes may therefore be considered as constituting the positive and negative half-cycle pulses of an A.C. source of potential as well as the D.C. pulses obtained from an A.C. source of potential through a half-wave or a full-wave rectifier. The advantage of operating the detector tube in such pulsating circuits is that the tube at the end of each applied voltage pulse is quenched by the voltage falling below the sustaining potential. This mode of operation permits the operating circuit to be designed for maximum power transfer without limitation to any quenching problem.

These detector tubes have heretofore been used with an ionizing gaseous filling of substantially pure hydrogen typically at a pressure of 160 millimeters of Hg. The striking potential for such tube is of the order of 700 volts and the sustaining potential is of the order of 330 volts. Since these voltages are substantially higher than the usual power line voltages it has been necessary to connect the ultraviolet detector tube to the power source through a voltage step-up transformer.

We have found that the striking voltage can be reduced to within the range of power line voltages while still maintaining the other advantageous features of the detector tube. These improvements are accomplished by using a gaseous filling composed of three gases: helium, hydrogen and a noble gas selected from the group consisting of neon, argon, krypton and zenon. Preferably, a gaseous filling is used which is predominantly helium with lesser percentages of hydrogen and neon in the order here named. For ultimate performance the gases should be in the ratio of the order of 148 mm. Hg of helium, 15 mm. Hg of hydrogen and 2 mm. Hg of neon. If argon, krypton or zenon is used in place of neon, it may be added in an amount which is in inverse proportion to the atomic weight thereof relative to that of neon—i.e., 1 mm. Hg or argon, ½ mm. Hg of krypton or ¼ mm. Mg of zenon. These particular combinations of gases reduce the striking potential to approximately 200 volts and the sustaining potential to approximately 160 volts. An important practical advantage of having a tube with such low striking potential is that it permits the tube to be connected directly to a 220 volt power line. Further, such tube will fire sooner and quench later during each half cycle of applied voltage than will a corresponding tube with pure hydrogen as the ionizing gas, to give a higher count rate, all other things being the same. The operating circuit 15 for the detector tube then comprises simply a plug connector 14 to be inserted in the socket of a power line, the detector tube 10, a rectifier 16, a load device for example a relay 17 shunted by a filter condenser 18, and a current-limiting impedance 19 diagrammatically represented. The current-limiting impedance may be simply a resistor or a parallel RC network to give a higher sensitivity to ultraviolet radiation below the saturation level as is taught and claimed in the pending application of Andre T. Abromaitis, Serial No. 265,177, filed March 14, 1963, and issued July 20, 1965, as Patent No. 3,196,273.

It has been known that a noble gas such as helium will result in a low striking potential of a radiation detector tube. However, the use of such noble gas by itself has not been operational because the neutral atoms of the gas can be excited to states of relatively high energy from which they do not readily return to the normal state since there is no direct radiative process for giving up their high energy content. These highly excited atoms are known as metastable atoms. Metastable atoms may have a lifetime in the gas of the order of milliseconds or even second because they are neutral and are not swept out of the gas by the electric field. When the metastable atoms collide with a solid surface such as an electrode their energy is released in a shortwave length radiation to cause the emission of an electron from the solid. This electron will in turn start an avalanche discharge with the result that the tube will pulse steadily even in the absence of ultraviolet excitation. It has been further known that the addition of a small percentage of hydrogen to helium has the beneficial effect of quenching the metastable atoms so that the tube will not count after the cessation of ultraviolet excitation.

We believe that a factor contributing to instability of hydrogen filled tubes is the transport of decomposition products from the glass envelope to the electrodes, particularly the transport of alkali atoms that remain in the glass lattice as a part of the flux used in making the glass. In the gaseous discharge there are generated hydrogen positive ions and also atomic hydrogen. The hydrogen ions are drawn to the negative electrode and are not detrimental; but, the atomic hydrogen, being mostly neutral, is diffused to the walls of the tube whereat, being highly reactive, it combines with the constituents of the glass to form gaseous compounds that can migrate to the electrodes. This migration contaminates the surfaces of the electrodes to change the spectral response. This change in the spectral response has a very deleterious effect on tubes which are intended to be solar blind and to have a high sensitivity to ultraviolet light, because it raises the count rate to solar light.

We have found that the addition of a small fraction of neon gas to the helium-hydrogen gas mixture has the very beneficial effect of keeping the tube solar blind while enhancing its sensitivity to ultraviolet radiation. When a noble gas such as helium or neon is used as the major constituent of the filling gas with hydrogen as the minor part, then the low voltage operation and the quenching of the metastable noble gas atoms as described above is achieved. We believe that certain other advantages accrue to such a combination, probably not previously recognized. In the first place, the reduction of the hydrogen content decreases the concentration of atomic hydrogen that is formed during the discharge. In the second place, it appears that the noble gas aids in the recombination of the hydrogen atoms into hydrogen molecules. Both of these effects tend to reduce the number of hydrogen atoms that reach the glass walls and there release contaminants that can reach the electrodes to alter the work function.

The effect of the noble gas on the hydrogen recombination may be inferred as follows. The disassociation energy of molecular hydrogen into two hydrogen atoms is 102.7 kcal. per mole or 4.465 electron volts per molecule. When two hydrogen atoms combine this energy has to be expended in radiation, since it cannot be transformed into kinetic energy of the two equal masses. If radiated, it would have to be at the corresponding wave length of about 2760 A. The hydrogen molecule does not have emission lines near this wave length. If two hydrogen atoms collided with a hydrogen molecule in a three body collision there would still be no radiative process available, and the chance would be small that just the right amount of momentum would be transferred to account for the energy. Actually most of the recombination takes place at the walls of the tube where conditions are more favorable, but where also the decomposition products of the glass are generated.

If now one of the noble gases is present in the hydrogen the chance of dissipating the energy in a three body collision is greatly enhanced. Helium has a number of emission lines in the neighborhood of 2760 Angstroms, neon has fewer and argon, krypton and zenon havel ines somewhat less favorably placed to be effective. The combination of hydrogen with helium should therefore be particularly effective. In the collision of two hydrogen atoms and one helium atom, the hydrogen atoms can unite to form a molecule and the excess energy is taken up by the helium atom which then radiates it. Not only does the hydrogen quench the helium metastables to reduce false counts, but at the same time helium promotes the recombination of hydrogen atoms to reduce the transport of material from the glass to the filaments.

Now, during the discharge, material is sputtered from the surface of whichever electrode is cathode and this tends to keep the cathode clean. Hydrogen and helium, however, are known to have a very low sputtering rate so that the discharge in these gases is not able to maintain the cathode free of surface impurities. Neon or argon or one of the other heavy noble gases on the other hand have a relatively high sputtering rate. Tubes filled with these gases and hydrogen do keep a clean cathode, but the sputtering of the tungsten tends to darken the bulb and limit the useful life of the tube. When tubes are filled with the mixture of gases in the range of compositions described above, wherein helium is the major constituent, neon the minor one, and hydrogen intermediate, then a tube results which has high sensitivity to ultraviolet radiation, poor long wave sensitivity, high stability, long life and low voltage operation. The small admixture of the heavier gas as a third element added to the previously known two-element filling provides a controlled low sputtering that promotes stability and long life of the tubes.

By way of illustrative example, detector tubes filled with pure hydrogen and with the present preferred combination of gases have the following relative operating characteristics: the tube filled with pure hydrogen when operated from a 60 cycle source of 700 volts R.M.S. responds typically at 2400 counts per minute to a propane flame one foot away and one and three-quarter inches high burning about 60 cc. of propane per minute. Also, such hydrogen filled tube will pass 18 milliamperes of current into a load resistor of 15,000 ohms to deliver approximately 5 watts of power. The same tube when filled with the preferred ratio of helium, hydrogen and neon as above-described, will when operated from a 60 cycle source of 220 volts R.M.S. respond at 2800 counts per minute to the same propane flame at the same distance. Further, the latter tube will pass aproximately 30 milliamperes current into a load resistor of approximately 2000 ohms to deliver approximately 1.8 watts of power. Since under equivalent conditions the delivered power would be in the ratio of the square of the operating voltages it would be expected on the basis of delivering 5 watts of power from 700 operating volts that the tube would deliver only .5 watt of power from 220 operating volts. The fact that the tube delivers instead 1.8 watts of power shows that the handling power of the tube is also enhanced by the use of the present novel combination of gases.

The embodiment of our invention herein particularly shown and described is intended to be illustrative and not limitative of our invention since the same is subject to changes and modifications without departure from the scope of our invention, which we endeavor to express according to the following claims.

We claim:

1. An ultraviolet detector tube comprising a closed gas envelope of radiation permeable material, an ionizable gaseous filling in said envelope, and a pair of electrodes in said envelope having portions in an adjacent relationship forming a single integrated working region wherein the emission of electrons responsive to incident ultraviolet radiation is effective to trigger an avalanche discharge when a striking potential is applied across said electrodes, said gaseous filling being composed of approximately 148 millimeters Hg of helium, 15 millimeters Hg of hydrogen and a noble gas selected from the group consisting of neon, argon, krypton and zenon, and said selected noble gas being in the amount of 2 millimeters Hg of neon, 1 millimeter Hg of argon, ½ millimeter Hg of krypton or ¼ millimeter Hg of zenon.

2. The ultraviolet detector tube set forth in claim 1 wherein said gaseous filling consists of approximately 148 millimeters Hg of helium, 15 millimeters Hg of hydrogen and 2 millimeters Hg of neon.

References Cited by the Examiner

UNITED STATES PATENTS

| | | | |
|---|---|---|---|
| 1,656,957 | 1/28 | Schroter | 313—185 |
| 2,582,367 | 1/52 | Williams | 313—185 X |
| 2,765,418 | 10/56 | Weisz | 313—93 |
| 2,944,152 | 7/60 | Johnson | 250—83.6 |
| 3,041,458 | 6/62 | Roxberry | 250—83.3 |
| 3,126,479 | 3/64 | Mattson | 250—83.6 |

RALPH G. NILSON, *Primary Examiner.*

JAMES W. LAWRENCE, *Examiner.*